US010814798B2

(12) United States Patent
Xu

(10) Patent No.: US 10,814,798 B2
(45) Date of Patent: Oct. 27, 2020

(54) EASY INSTALLING AND DISASSEMBLING VEHICLE MONITORING DEVICE

(71) Applicant: Shenzhen Dekar Technology Co., Ltd, Shenzhen, Guangdong (CN)

(72) Inventor: Xiaohui Xu, Guangdong (CN)

(73) Assignee: Shenzhen Dekar Technology Co., Ltd, Shenzhen (CN)

(*) Notice: Subject to any disclaimer, the term of this patent is extended or adjusted under 35 U.S.C. 154(b) by 0 days.

(21) Appl. No.: 16/626,877

(22) PCT Filed: Dec. 27, 2017

(86) PCT No.: PCT/CN2017/118966
§ 371 (c)(1),
(2) Date: Dec. 26, 2019

(87) PCT Pub. No.: WO2019/010927
PCT Pub. Date: Jan. 17, 2019

(65) Prior Publication Data
US 2020/0130606 A1    Apr. 30, 2020

(30) Foreign Application Priority Data

Jul. 10, 2017    (CN) .................... 2017 2 0829440 U

(51) Int. Cl.
*B60R 11/04*         (2006.01)
*G08C 17/02*         (2006.01)
(Continued)

(52) U.S. Cl.
CPC .............. *B60R 11/04* (2013.01); *G08C 17/02* (2013.01); *H04N 5/2253* (2013.01);
(Continued)

(58) Field of Classification Search
CPC .............. B60Q 9/008; B60R 2011/004; B60R 2011/0057; B60R 11/00;
(Continued)

(56) References Cited

U.S. PATENT DOCUMENTS

| 2009/0040300 A1* | 2/2009 | Scribner ............ H04N 5/23293 348/143 |
| 2014/0035737 A1* | 2/2014 | Rashid ................... B60Q 9/008 340/435 |

(Continued)

FOREIGN PATENT DOCUMENTS

AU    2010101153 A4    1/2011

OTHER PUBLICATIONS

International Search Report of PCT Patent Application No. PCT/CN2017/118966 dated Apr. 11, 2018.

*Primary Examiner* — Nathnael Aynalem

(57) ABSTRACT

The present application discloses an easy installing and disassembling vehicle monitoring device, which includes a board, a signal input device, a communication module, magnetic members, and a battery for powering the signal input device and the communication module. The board equipped with the signal input device, the communication module, and the battery may be directly attached to the housing of a vehicle through the magnetic members, thus punching holes in the vehicle is avoided, and installation and disassembly of the vehicle monitoring device is greatly facilitated. There is no restriction on installation positions, so the monitoring scope is greatly increased, and an improved driving safety may be achieved. The communication module sends the information collected by the signal input device to smart terminals through wireless network, thus no complicated wiring is needed, making the installa- (Continued)

tion and disassembly of the monitoring device much easier, and simultaneously achieving remote monitoring.

7 Claims, 4 Drawing Sheets

(51) Int. Cl.
*H04N 5/225* (2006.01)
*B60R 11/00* (2006.01)
*H02J 7/35* (2006.01)

(52) U.S. Cl.
CPC .............. *B60R 2011/004* (2013.01); *B60R 2011/0057* (2013.01); *H02J 7/35* (2013.01)

(58) Field of Classification Search
CPC ..... B60R 2011/0059; B60R 2011/0061; B60R 2001/1215; B60R 1/00; G08G 1/167; G08G 1/16; G08G 1/116; G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06T 2207/30236; G06T 2207/30248; G06T 2207/30252; G06T 2207/30256; G06T 2207/30261; G06T 2207/30264; G06T 2207/30268; B60W 50/14; B60W 2050/143; B60W 2550/10; B60W 2550/14
USPC ........................................................ 348/148
See application file for complete search history.

(56) References Cited

U.S. PATENT DOCUMENTS

| | | | |
|---|---|---|---|
| 2014/0160290 A1* | 6/2014 | Wu ........................ | B60R 1/00 348/148 |
| 2015/0172518 A1* | 6/2015 | Lucas .................. | H04N 5/2258 348/148 |
| 2016/0371981 A1 | 12/2016 | Suryaerlangga | |
| 2017/0057423 A1* | 3/2017 | Wang .................. | H04N 5/2254 |
| 2017/0080861 A1* | 3/2017 | Vora ...................... | H04N 5/2258 |
| 2018/0134234 A1* | 5/2018 | Nickolaou ........... | G03B 17/561 |

* cited by examiner

EASY INSTALLING AND DISASSEMBLING VEHICLE MONITORING DEVICE

FIELD

The present disclosure relates to the field of monitoring devices, and more particularly to an easy assembling and disassembling vehicle monitoring device.

BACKGROUND

Cars are the most commonly used tools in modern transportation. Monitoring devices are usually installed at the rear of the car near the bumper or license plate for the driver to observe the situation behind the car. The current method for installing the monitoring device is that, a drilling tool is used to drill a hole in the metal plate of the car first, then a camera is fixed in the hole, subsequently a control box is installed near the camera, and a display is finally installed in the cab of the car. The camera, the control box, and the display are connected by wires, and all the wires should be properly arranged in the car.

However, the method for installing the monitoring device is very complicated due to the limitation of the structure of the car. Further, drilling hole in the car may cause damage to the body of the car, and it is also time and labor consuming in case disassembly of the monitoring device is required.

SUMMARY

The present disclosure is to provide an easy installing and disassembling vehicle monitoring device, which aims to solve the problem of that the installing and disassembling of the conventional vehicle monitoring device is complicated.

In order to achieve the above aim, the present disclosure provides an easy installing and disassembling vehicle monitoring device, which includes a board, a signal input device, a communication module, magnetic members, and a battery for powering the signal input device and the communication module. The signal input device is electrically connected to the communication module; the magnetic members are connected to the board and configured to connect a housing of a vehicle; the signal input device and the communication module are both located in the board, and the communication module connects with a smart terminal through wireless network.

Preferably, the board includes a first plate and a second plate that are perpendicular to each other and connected at one end, and the magnetic members are evenly distributed on the first plate and/or the second plate.

The first plate and/or the second plate includes a cover plate and a baseplate connected to the cover plate, the baseplate is corresponding to a housing of a vehicle and defined with recesses for receiving the magnetic members, and each of the magnetic members defines a via hole to allow a screw passing through to connect the magnetic member to the first plate and/or the second plate.

The magnetic member further includes a spring and an adjusting nut; one end of the adjusting nut passes through the recess and connects to the screw, and the spring is located between the adjusting nut and the recess.

The cover plate is defined with a plurality of through holes, and the other end of the adjusting nut passes through the through hole.

Preferably, the easy installing and disassembling vehicle monitoring device further includes a plurality of shock-absorbing pads, and the plurality of shock-absorbing pads are respectively disposed on a side of the first plate and a side of the second plate closing to the vehicle body.

Preferably, the battery includes a rechargeable battery, the rechargeable battery is located in the second plate, and the rechargeable battery is able to be charged by a charger.

Optionally, the battery includes a solar battery and/or a wind energy battery, and the solar battery or the wind energy battery is disposed in the first plate.

Preferably, the signal input device includes a single or a plurality of cameras, a sensor, and/or a positioner.

Optionally, the easy installing and disassembling vehicle monitoring device further includes an alarm device, the alarm device connects with the communication module and the battery.

According to the present disclosure, the board equipped with the signal input device, the communication module, and the battery can be directly attached to the housing of a vehicle through a plurality of the magnetic members, thus punching holes in the vehicle is avoided, and installation and disassembly of the monitoring device is facilitated. Further, there is no restriction on installation position for the board, thus the monitoring scope is enlarged and an improved driving safety may be achieved.

In addition, the communication module sends the information collected by the signal input device to the smart terminal through wireless network, thus no complicated wiring is needed, making the installation and disassembly of the monitoring device much easier, and simultaneously achieving remote monitoring.

DESCRIPTION OF REFERENCE NUMERALS

Figure 1:
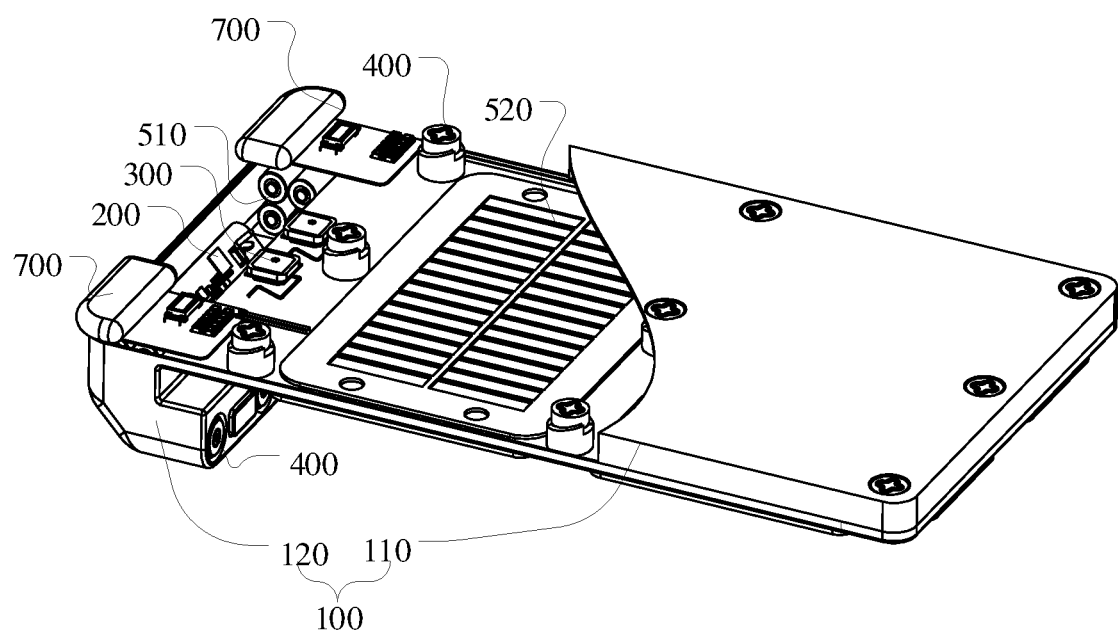
FIG. 1 is a perspective view of an easy installing and disassembling vehicle monitoring device in accordance with an embodiment of the present disclosure.

| Reference numeral | Name |
| --- | --- |
| 100 | board |
| 110 | first plate |
| 111 | cover plate |
| 112 | baseplate |
| 120 | second plate |
| 130 | recess |
| 131 | first spiral convex portion |
| 200 | signal input device |
| 300 | communication module |
| 400 | magnetic member |
| 410 | spring |
| 420 | adjusting nut |
| 421 | second spiral convex portion |
| 430 | screw |
| 510 | rechargeable battery |
| 520 | solar battery |
| 600 | shock-absorbing pad |
| 700 | alarm device |

DETAILED DESCRIPTION OF THE EMBODIMENTS

The technical solutions of the embodiments of the present disclosure will be clearly and completely described in the following with reference to the accompanying drawings.

Please referring to FIG. 1, the present disclosure provides an easy installing and disassembling vehicle monitoring device, which includes a board 100, a signal input device 200, a communication module 300, magnetic members 400, and a battery for powering the signal input device 200 and the communication module 300. The signal input device 200 is electrically connected to the communication module 300; the magnetic members 400 are connected to the board 100 and configured for connecting the housing of a vehicle; the signal input device 200 and the communication module 300 are both located in the board 100, and the communication module 300 connects to smart terminals through wireless network.

In the present disclosure, the board 100 equipped with the signal input device 200, the communication module 300, and the battery may be directly attached to the housing of a vehicle through a plurality of the magnetic members 400, thus punching holes in the vehicle is avoided, and installation and disassembly of the vehicle monitoring device is greatly facilitated. Further, the vehicle monitoring device can be applied to a variety of car models benefit by its simple structure, and there is no restriction on installation positions, such as near the bumper or the license plate, since it can be directly attached to the housing of the vehicle, so the monitoring scope is greatly increased, accidents caused by monitoring blind spots may be avoid, and an improved driving safety may be achieved.

The signal input device 200 is configured to collect environmental information, which is then transmitted by the communication module 300 to the smart terminal via wireless network. People can obtain monitoring information and make feedback instructions on the smart terminal. The communication module 300 includes a remote communication module and a short-range communication module, which can communicate with a remote smart terminal and a short-range smart terminal, respectively. The smart terminal may be a mobile phone, a personal computer (PC) client, or a center console of car, which is configured for people to observe and give order. The smart terminal may also be a cloud server which immediately stores the uploaded information for being acquired at any time. Since the communication module 300 is connected to the smart terminal through wireless network, and only a few short wires are needed to connect the components mounted on the board 100, no additional wiring is required when installing the vehicle monitoring device to the vehicle. As such, the vehicle monitoring device may not only be easily to be installed to the vehicle but also be easily disassembled from the vehicle. In addition, the signal is sent to the smart terminal by wireless network, thus remote monitoring is realized.

Please referring to FIG. 1 again, the board 100 includes a first plate 110 and a second plate 120 that are perpendicular to each other and connected at one end, and the magnetic members 400 are evenly distributed on the first plate 110 and/or the second plate 120.

Figure 2:
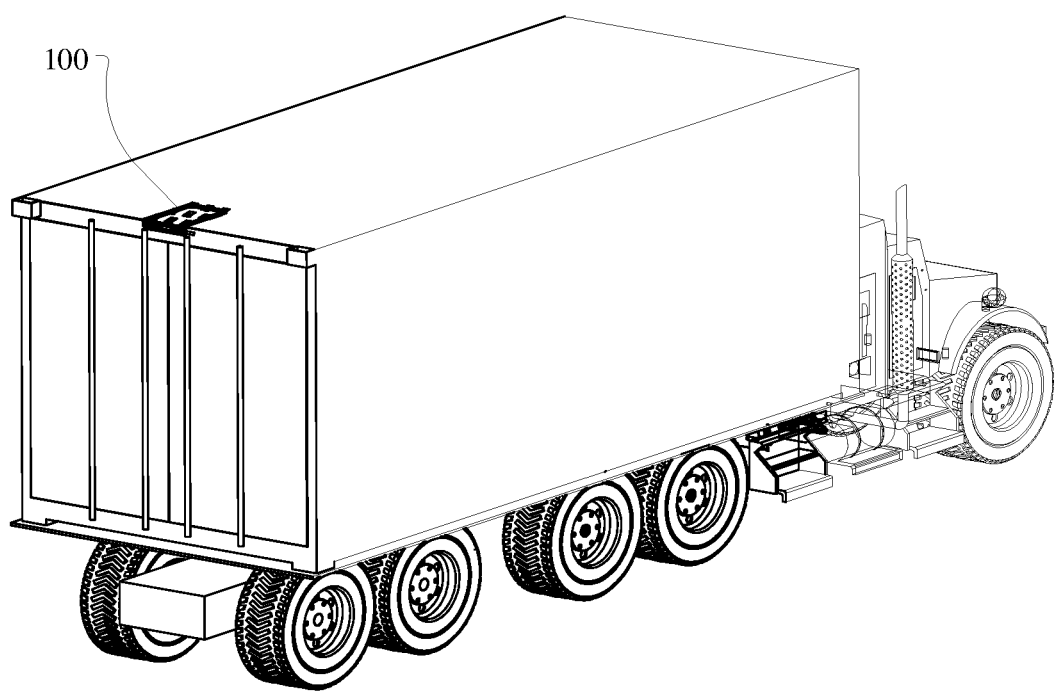
FIG. 2 is a schematic view of mounting the easy installing and disassembling vehicle monitoring device in accordance with an embodiment of the present disclosure.

In order to increase the stability of installation, the board 100 of the present disclosure adopts two vertically connected plates 110 and 120, which can get stuck on the outer edge of the car roof and are not prone to fall. It should be understood that, the two plates 110 and 120 can also connect with a certain angle to fit with a certain portion of various housings of vehicles. A container truck is taken as an example, as shown in FIG. 2, the first plate 110 and the second plate 120 are connected and form an L-shaped board 100, part of the inner side of the board 100 fits the surface of the carriage and part of the inner side of the board 100 get stuck on the outer edge of the carriage roof, specifically, the first plate 110 is horizontally placed on the carriage roof, and the second plate 120 is vertically attached to the rear surface of the carriage. The magnetic members 400 fix the board 100 on the surface of the carriage.

The signal input device 200 may be disposed in the second plate 120 to facilitate the signal input device 200 to receive signals from all around. A downward end of the second plate 120 may define an inclined plane, and the signal input device 200 is located at the inclined plane to increase the monitoring scope.

The edge of the vehicle body is commonly defined with a protrusion to prevent water leakage in rainy days. Preferably, a dent may be defined in the side of the second plate 120 closing to the vehicle body, that is, in the side of the inner corner formed by the second plate 120 and the first plate 110, so that the protrusion is allowed to be caught in the dent, so as to closely fit the vehicle monitoring device to the vehicle body and increase the connection stability of the vehicle monitoring device and the vehicle body. It should be understood that, the present disclosure is not limited to the above dent, the structure or shape can also be correspondingly changed in accordance with the special shape of the vehicle body.

Figure 3:
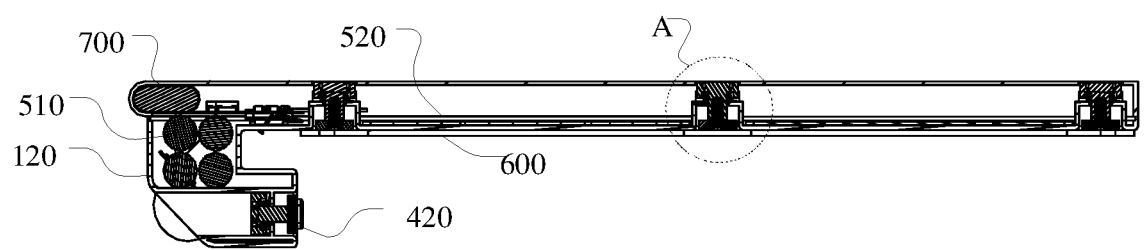
FIG. 3 is a cross sectional view of the easy installing and disassembling vehicle monitoring device in accordance with an embodiment of the present disclosure.
Figure 4:
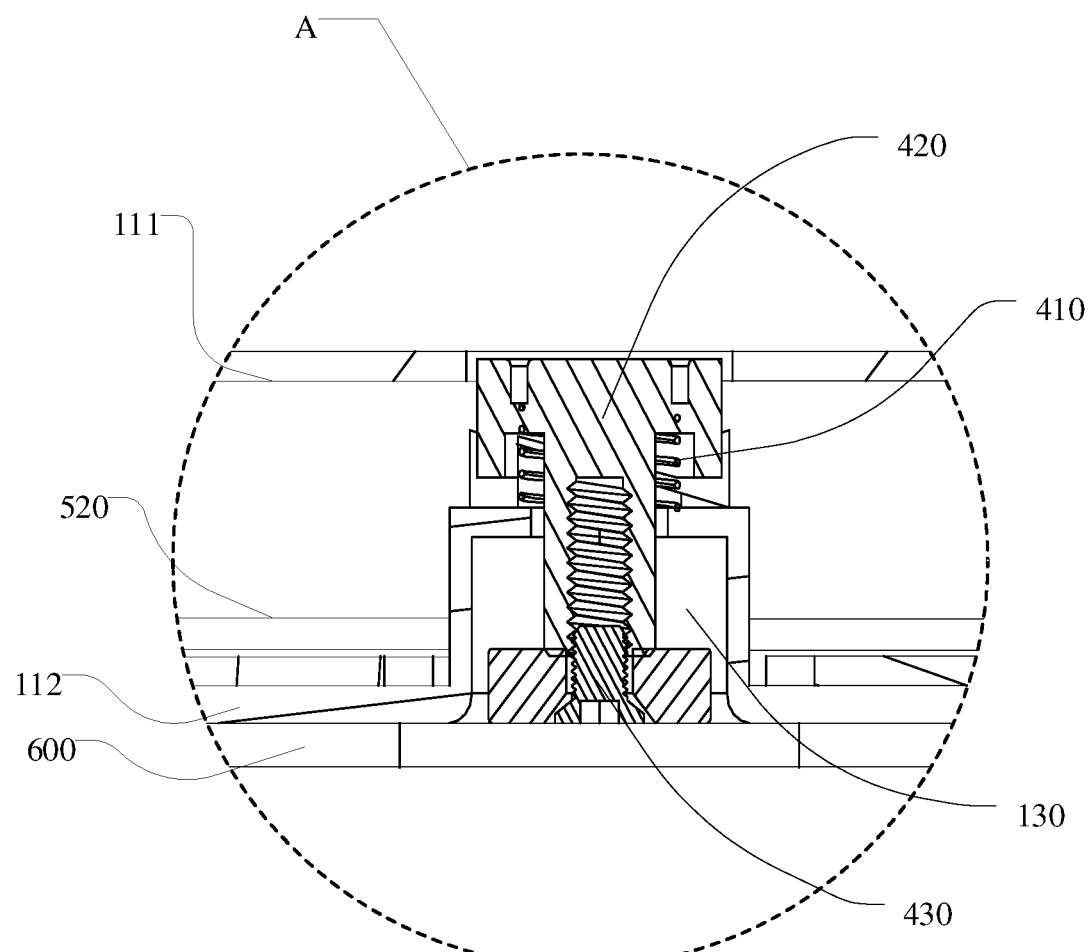
FIG. 4 is an enlarged view of portion A in FIG. 3.

Please referring to FIGS. 3 and 4, the first plate 110 and/or the second plate 120 includes a cover plate 111 and a baseplate 112 connected to the cover plate 111. The baseplate 112 corresponds to the housing of a vehicle and defines a recess 130 for receiving the magnetic member 400. The magnetic member 400 defines a via hole for a screw 430 to pass through to connect the magnetic member 400 to the first plate 110 and/or the second plate 120.

The signal input device 200, the communication module 300, and the battery are all located between the cover plate 111 and the baseplate 112. The baseplate 112 abuts the vehicle body, and the cover plate 111 is at the side far from the vehicle body.

The screw 430 is preferably a countersunk head screw 430, and the via hole defined in the magnetic member 400 is shaped to match the countersunk head screw 430, so that after the screw 430 passes through the magnetic member 400 and fixes the magnetic member 400 to the baseplate 112, the screw head is submerged into the magnetic member 400, thus the distance between the magnetic member 400 and the vehicle body is reduced to increase the magnetism, and the connection stability between the magnetic member 400 and the vehicle body is increased. The depth of the recess 130 should be greater than the thickness of the magnetic member 400, preferably twice or more, so as to facilitate the upward and downward movement of the magnetic member 400.

Please referring to FIG. 4, the magnetic member 400 further includes a spring 410 and an adjusting nut 420. One end of the adjusting nut 420 passes through the recess 130 to connect with the screw 430, and the spring 410 is positioned between the adjusting nut 420 and the recess 130.

When installing, the first plate and the second plate get stuck to the edge of the housing of the vehicle first, then the adjusting nut 420 is turned counterclockwise to increase the distance between the screw 430 and the adjusting nut 420, so as to reduce the distance between the magnetic member 400 and the housing of the vehicle until the magnetic member 400 is attached to the housing, finishing the fixing of the vehicle monitoring device.

Then, the adjusting nut 420 is slightly tightened clockwise, making the spring 410 be in a compressed state and the magnetic member 400 not to leave the vehicle body.

When disassembling, the adjusting nut 420 is continuously tighten clockwise to shorten the distance between the screw 430 and the adjusting nut 420. The baseplate 112 over the recess 130 limits the displacement of the adjusting nut 420 towards the screw 430, forcing the screw 430 to move towards the adjusting nut 420, so as to pull the magnetic member 400 away from the vehicle body. Since the spring 410 was in a compressed state, in case the adsorption force of the magnetic member 400 is less than the elastic force of the spring 410, the spring 410 will force the screw 430 to drive the magnetic member 400 away from the vehicle body, completing the disassembly.

Preferably, the magnetic member 400 is made of strong magnetic material for increasing the connection stability of the magnetic member 400 with the vehicle.

Figure 5:
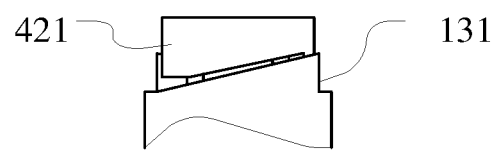
FIG. 5 is a structure diagram of two pairs of spiral convex portions in according with an embodiment of the present disclosure.

Please referring to FIG. 5, the baseplate 112 over the recess 130 may be oppositely defined with two first spiral convex portions 131 having the same rotation direction, and each of the spiral convex portions defines a quarter of a thread. Correspondingly, two second spiral convex portions 421 are oppositely defined on a side of the adjusting nut 420 closing to the baseplate 112, and the rotation direction of the second spiral convex portion 421 is opposite to that of the first spiral convex portion 131. The spring 410 is located between the second spiral convex portion 421 and the recess 130. For the magnetic member 400 attaching to the vehicle body, the adjusting nut 420 needs to be slightly tightened to keep the spring 410 in a compressed state, the two pairs of spiral convex portions may limit the adjusting nut 420 over-tightening during operating, thus prevent the magnetic member 400 from being pulled away from the vehicle body due to the adsorption force of the magnetic member 400 to the vehicle body being smaller than the elastic force of the spring 410.

Referring to FIG. 4, the cover plate 111 is defined with a plurality of through holes, and the other end of the adjusting nut 420 passes through the through hole.

The other end of the adjusting nut 420 may be provided with a pattern trepanning. A pattern screwdriver is also provided to match with the pattern trepanning of the adjusting nut 420. Preferably, the pattern trepanning is a cross-plum blossom-shaped groove, and the adjusting nut 420 can only be rotated by the pattern screwdriver. The special design can play a role in preventing theft. The pattern trepanning may also be shaped as a hollow square groove, a star-shaped protrusion, and the like. Correspondingly, a screwdriver matching the hollow square groove, or a star-shaped knob matching the star-shaped protrusion would be provided.

Please referring to FIGS. 3 and 4, the easy installing and disassembling vehicle monitoring device further includes a plurality of shock-absorbing pads 600, and the plurality of shock-absorbing pads 600 are respectively disposed on a side of the first plate 110 and a side of the second plate 120 closing to the vehicle body.

The vehicle is prone to bumps during traveling. The arrangement of the shock-absorbing pads pad 600 will reduce the damage of the vehicle monitoring device causing by the bumps. As a preference, the shock-absorbing pad 600 is made of elastic material, such as silicone.

Please referring to FIGS. 1 and 3, the battery includes a rechargeable battery 510. The rechargeable battery 510 is located in the second plate 120, and the rechargeable battery 510 is able to be charged by a charger.

The rechargeable battery 510 may be prevented from damaging for it is located in the second plate 120. The second plate 120 may be defined with a charging interface for the battery to connect a charger for charging. Since the rechargeable battery 510 can be charged, there is no need to disassemble the vehicle monitoring device to replace battery. The rechargeable battery 510 may be charged by a common alternating current (AC) power or a vehicle power supply.

Please referring to FIG. 1, the battery includes a solar battery 520 and/or a wind energy battery. The solar battery 520 or the wind energy battery is disposed in the first plate 110.

The solar battery 520 is disposed between the cover plate 111 and the baseplate 112, and is horizontally arranged to receive sunlight better and convert it into electrical energy to charge the rechargeable battery 510. The solar battery 520 is able to power the vehicle monitoring device in case it is not convenient to charge the rechargeable battery using a charger.

Wind will generate as the car travels fast. In the present disclosure, a wind energy battery is provided to the first plate 110 to charge the rechargeable battery 510 making use of wind energy, so the vehicle monitoring device can be continuously powered even at night.

Preferably, the signal input device 200 may include a single or a plurality of cameras, a sensor, and/or a positioner.

The signal input device 200 may include a plurality of cameras which take pictures from different angles, and the pictures are uploaded to the smart terminal via the communication module 300 for people to monitor and timely detect the abnormalities. The smart terminal may be set up real-time archiving. When abnormalities are found, the archived video may be used as evidence for special situations. The camera is preferably disposed in the second plate 120. Correspondingly, the cover plate 111 of the second plate 120 may be defined with a hole and a bowl-shaped transparent cover, and the cover's opening faces the camera, to seal the camera in the board 100, so that the cameras would not be affected by wind and rain, prolonging its service life. Simultaneously, the cover does not affect the camera's shooting effect.

The signal input device 200 may also include various sensors, such as a temperature sensor, which monitors the temperature in real time and detects abnormal temperature conditions, for example a fire, in time; such as a displacement sensor, which is installed near the car door along with the monitoring device. If the car door is opened abnormally, the driver can promptly find out the anomaly and take actions. Especially in the visual blind spot near the rear door, in case the car door is opened during the journey, the driver can also discover the anomaly in time by the information sent from the communication module 300 to the car's console, so the driver can handle the anomaly in time to avoid accidents; such as a humidity sensor, for responding in time in case the car falls into water; and such as a crash sensor, which gives feedback on accidents, for instance, a rear-end collision.

The signal input device 200 may also be a GPS locator. No matter how far the car owner is from his car, he can always monitor the position of the vehicle in real time and respond to various unexpected situations timely. The description above are all preferred embodiments of the present disclosure, and some other suitable signal input devices can also be used according to actual needs.

Please referring to FIG. 1, optionally, the easy installing and disassembling vehicle monitoring device may further include an alarm device 700. The alarm device 700 connects with the communication module 300 and the battery.

The alarm device 700 may be an alarm light or a horn. The alarm light is defined on the board 100. In case the current rear vehicle is too close, the alarm light flashes to remind the rear vehicle to maintain a safe distance. The horn may be set in the car. In case an abnormal situation occurs at the rear of the car, such as the door is opened, a fire, etc., the driver will be alerted in time. The horn may also be installed outside the car. In case the car owner finds an abnormal situation by the smart terminal, such as a theft, he can send instructions via the smart terminal to make the horn send an alarm to scare off the thief, to ensure the safety of the car.

It should be noted that, in the embodiments of the present disclosure, the description which relates to "first", "second", etc., is only used to distinguish technical features, and cannot be understood as expressing or implying their relative importance, sequence, and the quantity of technical features indicated. Therefore, the technical features defined as "first" or "second" can be understood as including at least one technical feature.

The technical solutions between the various embodiments of the present disclosure can be combined with each other, but must be based on those that can be implemented by a person of ordinary skill in the art. If the combination of technical solutions conflicts or cannot be realized, the combination of schemes is considering not exist and is not within the scope of the present disclosure.

What has been described above are only parts or preferred embodiments of the present disclosure for illustration, and neither the text nor the drawings are considering to limit the scope of protection of the present disclosure. And any changes made in detail, especially in matters of shape, size, and arrangement of parts within the principles of the disclosure to the full extent indicated by the broad general meaning of the terms where the appended claims are expressed, are all included in the protection scope of the present disclosure.

What is claimed is:

1. An easy installing and disassembling vehicle monitoring device, comprising:
   a board, a signal input device, a communication module, magnetic members, and a battery for powering the signal input device and the communication module;
   the signal input device being electrically connected to the communication module;
   the magnetic members being connected to the board and configured to connect a housing of a vehicle; and
   the signal input device and the communication module being both located in the board, and the communication module connecting with a smart terminal through wireless network;
   wherein the board comprises a first plate and a second plate that are perpendicular to each other and connected at one end, and the magnetic members are evenly distributed on the first plate and/or the second plate;
   the first plate and/or the second plate comprises a cover plate and a baseplate connected to the cover plate, the baseplate is corresponding to a housing of a vehicle and defined with recesses for receiving the magnetic members, and each of the magnetic members defines a via hole to allow a screw passing through to connect the magnetic member to the first plate and/or the second plate;
   the magnetic member further comprises a spring and an adjusting nut one end of the adjusting nut passes through the recess and connects to the screw, and the spring is located between the adjusting nut and the recess.

2. The vehicle monitoring device according to claim 1, wherein the cover plate is defined with a plurality of through holes; the other end of the adjusting nut passes through the through hole.

3. The vehicle monitoring device according to claim 1, further comprising a plurality of shock-absorbing pads, the plurality of shock-absorbing pads being respectively disposed on a side of the first plate closing to a vehicle body and a side of the second plate closing to the vehicle body.

4. The vehicle monitoring device according to claim 1, wherein the battery comprises a rechargeable battery, the rechargeable battery is located in the second plate, and the rechargeable battery is charged by a charger.

5. The vehicle monitoring device according to claim 1, wherein the battery comprises a solar battery and/or a wind energy battery, and the solar battery or the wind energy battery is disposed in the first plate.

6. The vehicle monitoring device according to claim 1, wherein the signal input device comprises a single or a plurality of cameras, a sensor, and/or a positioner.

7. The vehicle monitoring device according to claim 1, further comprising an alarm device, the alarm device connecting with the communication module and the battery.

* * * * *